(12) United States Patent
Evulet

(10) Patent No.: US 12,546,273 B2
(45) Date of Patent: Feb. 10, 2026

(54) FLUIDIC TURBO HEATER SYSTEM

(71) Applicant: JETOPTERA, INC., Edmonds, WA (US)

(72) Inventor: Andrei Evulet, Edmonds, WA (US)

(73) Assignee: Jetoptera, Inc., Edmonds, WA (US)

( * ) Notice: Subject to any disclaimer, the term of this patent is extended or adjusted under 35 U.S.C. 154(b) by 0 days.

(21) Appl. No.: 18/608,863

(22) Filed: Mar. 18, 2024

(65) Prior Publication Data

US 2025/0043713 A1 Feb. 6, 2025

Related U.S. Application Data

(60) Continuation of application No. 17/087,533, filed on Nov. 2, 2020, now Pat. No. 11,965,456, and a continuation-in-part of application No. 16/786,894, filed on Feb. 10, 2020, now Pat. No. 11,053,012, and a continuation-in-part of application No. 16/709,733, filed on Dec. 10, 2019, now abandoned, said application No. 17/087,533 is a continuation-in-part of application No. 16/685,551, filed on Nov. 15, 2019, and a continuation-in-part of application No. 16/675,104, filed on Nov. 5, 2019, now Pat. No. 11,505,316, and a continuation-in-part of application
(Continued)

(51) Int. Cl.
| | |
|---|---|
| *F02K 1/36* | (2006.01) |
| *F01D 25/30* | (2006.01) |
| *F02B 27/06* | (2006.01) |
| *F02K 1/00* | (2006.01) |
| *F23L 17/16* | (2006.01) |
| *F24H 3/04* | (2022.01) |

(52) U.S. Cl.
CPC .............. *F02K 1/36* (2013.01); *F01D 25/305* (2013.01); *F02B 27/06* (2013.01); *F02K 1/002* (2013.01); *F23L 17/16* (2013.01); *F24H 3/04* (2013.01); *Y02T 10/12* (2013.01)

(58) Field of Classification Search
CPC . F02K 1/36; F02K 1/002; F02K 1/006; B64C 15/00; B64C 15/14; B64C 21/00; B64C 21/04; F24D 5/02
See application file for complete search history.

(56) References Cited

U.S. PATENT DOCUMENTS

| | | | | |
|---|---|---|---|---|
| 1,495,185 | A * | 5/1924 | Kirgan | F04F 5/466 417/167 |
| 2,922,277 | A * | 1/1960 | Bertin | F02K 1/36 180/129 |

(Continued)

FOREIGN PATENT DOCUMENTS

WO WO-0194197 A1 * 12/2001 ............ B01F 23/232

*Primary Examiner* — Alain Chau
(74) *Attorney, Agent, or Firm* — Richard T. Black; FisherBroyles, LLP

(57) ABSTRACT

A heating system is configured to produce heated fluid. The system includes a source of primary fluid, a diffusing structure comprising an outlet structure out of which the heated fluid flows, at least one conduit coupled to the source and the diffusing structure and configured to introduce to the diffusing structure the primary fluid, and an intake structure coupled to the diffusing structure and configured to introduce to the diffusing structure a secondary fluid accessible to the system. The heated fluid includes the primary and secondary fluids.

7 Claims, 3 Drawing Sheets

Related U.S. Application Data

Figure 1:
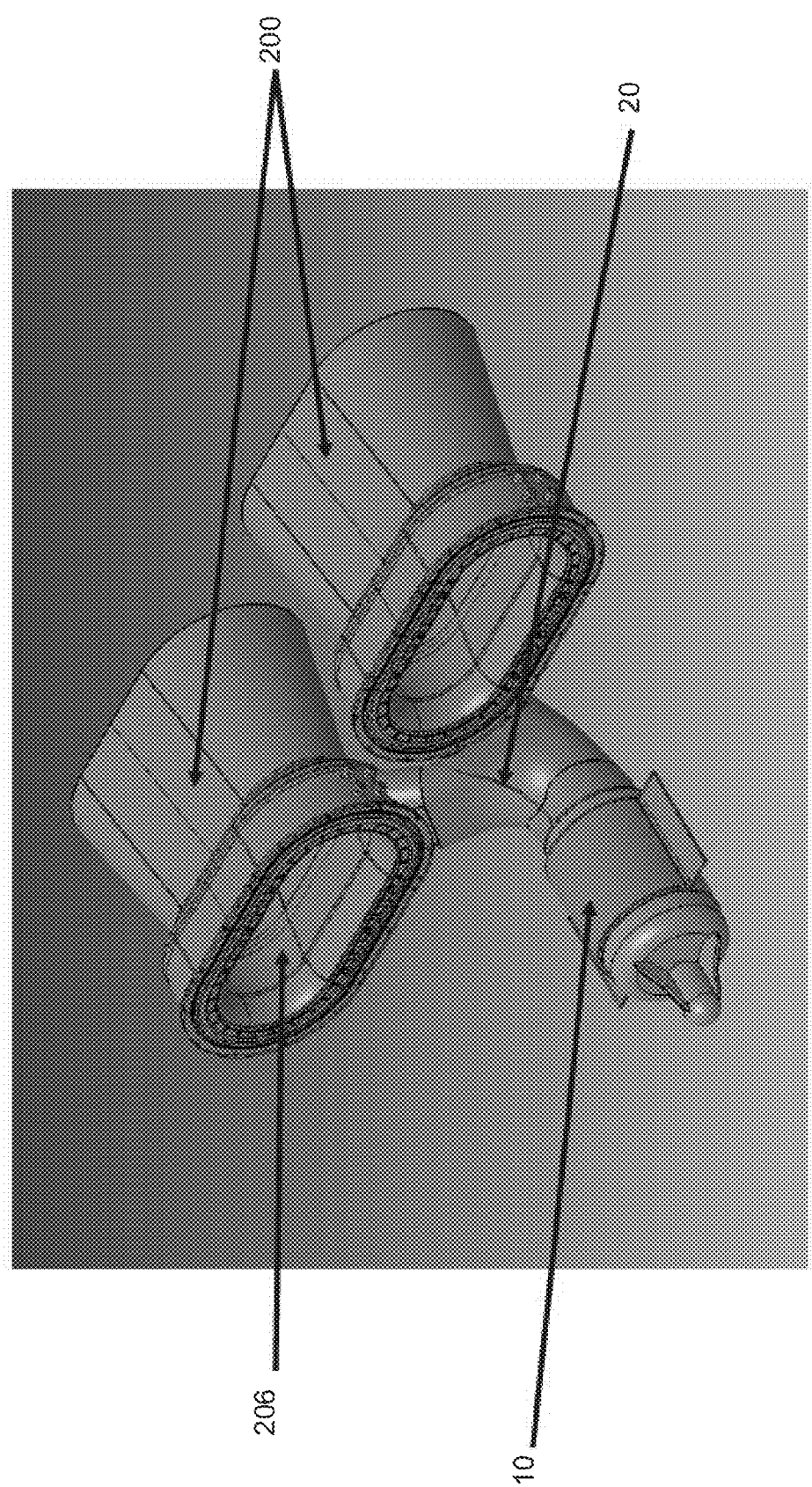

No. 16/656,529, filed on Oct. 17, 2019, now abandoned, and a continuation-in-part of application No. 16/221,362, filed on Dec. 14, 2018, now Pat. No. 10,919,636, and a continuation-in-part of application No. 16/031,539, filed on Jul. 10, 2018, now abandoned, said application No. 16/685,551 is a continuation of application No. 15/670,943, filed on Aug. 7, 2017, said application No. 16/786,894 is a continuation of application No. 15/625,907, filed on Jun. 16, 2017, said application No. 16/675,104 is a continuation of application No. 15/456,450, filed on Mar. 10, 2017, and a continuation-in-part of application No. PCT/US2017/021975, filed on Mar. 10, 2017, said application No. 16/656,529 is a continuation of application No. 15/368,428, filed on Dec. 2, 2016, and a continuation-in-part of application No. PCT/US2016/064827, filed on Dec. 2, 2016, said application No. 16/221,362 is a division of application No. 15/256,178, filed on Sep. 2, 2016, said application No. 15/456,450 is a continuation-in-part of application No. 15/256,178, filed on Sep. 2, 2016, and a continuation-in-part of application No. PCT/US2016/050236, filed on Sep. 2, 2016, said application No. 15/625,907 is a continuation-in-part of application No. 15/221,389, filed on Jul. 27, 2016, said application No. 16/031,539 is a division of application No. 15/221,439, filed on Jul. 27, 2016, said application No. 15/221,389 is a continuation-in-part of application No. PCT/US2016/044327, filed on Jul. 27, 2016, said application No. 16/709,733 is a continuation of application No. 15/221,389, filed on Jul. 27, 2016.

(60) Provisional application No. 62/929,522, filed on Nov. 1, 2019, provisional application No. 62/531,817, filed on Jul. 12, 2017, provisional application No. 62/525,592, filed on Jun. 27, 2017, provisional application No. 62/380,108, filed on Aug. 26, 2016, provisional application No. 62/379,711, filed on Aug. 25, 2016, provisional application No. 62/371,926, filed on Aug. 8, 2016, provisional application No. 62/371,612, filed on Aug. 5, 2016, provisional application No. 62/307,318, filed on Mar. 11, 2016, provisional application No. 62/263,407, filed on Dec. 4, 2015, provisional application No. 62/213,465, filed on Sep. 2, 2015.

(56) References Cited

U.S. PATENT DOCUMENTS

| | | | | |
|---|---|---|---|---|
| 3,040,523 A * | 6/1962 | Price | F02K 1/06 | 239/592 |
| 3,566,823 A * | 3/1971 | Hope-Gill | F02K 1/36 | 60/230 |
| 3,685,737 A * | 8/1972 | Ronald | F02K 1/36 | 239/265.29 |
| 3,694,107 A * | 9/1972 | Stein | F04F 5/46 | 417/167 |
| 3,819,134 A * | 6/1974 | Throndson | B64C 29/0041 | 180/117 |
| 3,885,891 A * | 5/1975 | Throndson | F04F 5/466 | 417/196 |
| 4,196,585 A * | 4/1980 | Svischev | F02K 1/36 | 239/265.17 |
| 4,332,529 A * | 6/1982 | Alperin | F02K 1/36 | 417/198 |
| 4,587,804 A * | 5/1986 | Horinouchi | F02K 1/36 | 60/230 |
| 4,592,202 A * | 6/1986 | Stewart | F02K 9/78 | 416/171 |
| 4,815,942 A * | 3/1989 | Alperin | F04F 5/467 | 417/198 |
| 5,074,759 A * | 12/1991 | Cossairt | F04F 5/464 | 417/171 |
| 5,205,119 A * | 4/1993 | Bulman | F02K 7/18 | 60/269 |
| 5,699,966 A * | 12/1997 | Beverage | F02K 1/006 | 239/265.19 |
| 6,662,549 B2 * | 12/2003 | Burns | B63H 11/02 | 60/221 |
| 6,877,960 B1 * | 4/2005 | Presz, Jr. | F04F 5/46 | 417/183 |
| 6,983,587 B2 * | 1/2006 | Shumate | F02K 9/97 | 60/211 |
| 7,823,838 B1 * | 11/2010 | De ning | B64C 15/02 | 244/55 |
| 10,800,538 B2 * | 10/2020 | Evulet | B64D 27/10 | |
| 10,875,658 B2 * | 12/2020 | Evulet | B64D 27/18 | |
| 11,965,456 B2 * | 4/2024 | Evulet | F02C 7/10 | |
| 2003/0013356 A1 * | 1/2003 | Burns | B63H 11/02 | 440/38 |
| 2013/0087632 A1 * | 4/2013 | Germain | F02K 1/36 | 239/265.23 |
| 2014/0373546 A1 * | 12/2014 | Ammon | F02C 3/32 | 60/689 |

* cited by examiner

FLUIDIC TURBO HEATER SYSTEM

PRIORITY CLAIM

This application is a continuation of U.S. patent application Ser. No. 17/087,533 filed Nov. 2, 2020, which application claims priority to U.S. Provisional Patent Application No. 62/929,522 filed Nov. 1, 2019, the entirety of which is hereby incorporated by reference as if fully set forth herein.

This Application is a continuation-in-part of U.S. patent application Ser. No. 16/685,551 filed Nov. 15, 2019, which is a continuation of U.S. patent application Ser. No. 15/670,943 filed Aug. 7, 2017, which claims the benefit of U.S. Provisional Application No. 62/371,612 filed Aug. 5, 2016; 62/371,926 filed Aug. 8, 2016; 62/379,711 filed Aug. 25, 2016; 62/380,108 filed Aug. 26, 2016; 62/525,592 filed Jun. 27, 2017; and 62/531,817 filed Jul. 12, 2017.

This Application is a continuation-in-part of U.S. patent application Ser. No. 16/656,529 filed Oct. 17, 2019, which is a continuation of Ser. No. 15/368,428 filed Dec. 2, 2016; which claims the benefit of Application No. 62/263,407 filed Dec. 4, 2015.

This Application is a continuation-in-part of International Application No. PCT/US16/64827 filed Dec. 2, 2016; which claims the benefit of Application No. 62/263,407 filed Dec. 4, 2015.

This Application is a continuation-in-part of U.S. patent application Ser. No. 16/675,104 filed Nov. 5, 2019; which is continuation of U.S. patent application Ser. No. 15/456,450 filed Mar. 10, 2017, now U.S. Pat. No. 10,464,668; which claims the benefit of Application No. 62/307,318 filed Mar. 11, 2016; and is a continuation-in-part of U.S. patent application Ser. No. 15/256,178 filed Sep. 2, 2016, now U.S. Pat. No. 10,207,812; which claims the benefit of Application No. 62/213,465 filed Sep. 2, 2015.

This Application is a continuation-in-part of International Application No. PCT/US17/21975 filed Mar. 10, 2017; which claims the benefit of 62/307,318 filed Mar. 11, 2016.

This Application is a continuation-in-part of U.S. patent application Ser. No. 16/709,733 filed Dec. 10, 2019; which is a continuation of U.S. patent application Ser. No. 15/221,389 filed Jul. 27, 2016, now U.S. Pat. No. 10,501,197; which claims the benefit of Application No. 62/213,465 filed Sep. 2, 2015.

This Application is a continuation-in-part of International Application No. PCT/US16/44327 filed Jul. 27, 2016; which claims the benefit of Application No. 62/213,465 filed Sep. 2, 2015.

This Application is a continuation-in-part of U.S. patent application Ser. No. 16/786,894 filed Feb. 10, 2020; which is a continuation of U.S. patent application Ser. No. 15/625,907 filed Jun. 16, 2017; which is a continuation-in-part of U.S. patent application Ser. No. 15/221,389 filed Jul. 27, 2016, now U.S. Pat. No. 10,501,197; which claims the benefit of 62/213,465 filed Sep. 2, 2015.

This Application is a continuation-in-part of U.S. patent application Ser. No. 16/031,539 filed Jul. 10, 2018; which is a divisional of U.S. patent application Ser. No. 15/221,439 filed Jul. 27, 2016, now U.S. Pat. No. 10,800,538; which claims the benefit of Application No. 62/213,465 filed Sep. 2, 2015.

This Application is a continuation-in-part of International Application No. PCT/US16/44326 filed Jul. 27, 2016; which claims the benefit of Application No. 62/213,465 filed Sep. 2, 2015.

This Application is a continuation-in-part of U.S. patent application Ser. No. 16/221,362 filed Dec. 14, 2018; which is a divisional of U.S. patent application Ser. No. 15/256,178 filed Sep. 2, 2016, now U.S. Pat. No. 10,207,812; which claims the benefit of Application No. 62/213,465 filed Sep. 2, 2015.

This Application is a continuation-in-part of International Application No. PCT/US16/50236 filed Sep. 2, 2016; which claims the benefit of Application No. 62/213,465 filed Sep. 2, 2015.

All of the aforementioned applications are hereby incorporated by reference as if fully set forth herein.

COPYRIGHT NOTICE

This disclosure is protected under United States and/or International Copyright Laws. © 2024 Jetoptera, Inc. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

BACKGROUND

Legacy systems for heating large spaces or volumes or surfaces are direct and indirect firing systems using natural gas, propane or liquid fuel. Liquid fuel systems use Diesel of Fuel Oil, sometimes in an internal combustion engine such as Diesel. The latter are usually inefficient and in need of maintenance every 300-400 hours of operation; they are also emitting combustion NOx, CO and Unburned Hydrocarbons (UHC) as well as particulates.

BRIEF DESCRIPTION OF THE DRAWING FIGURES

Figure 2:
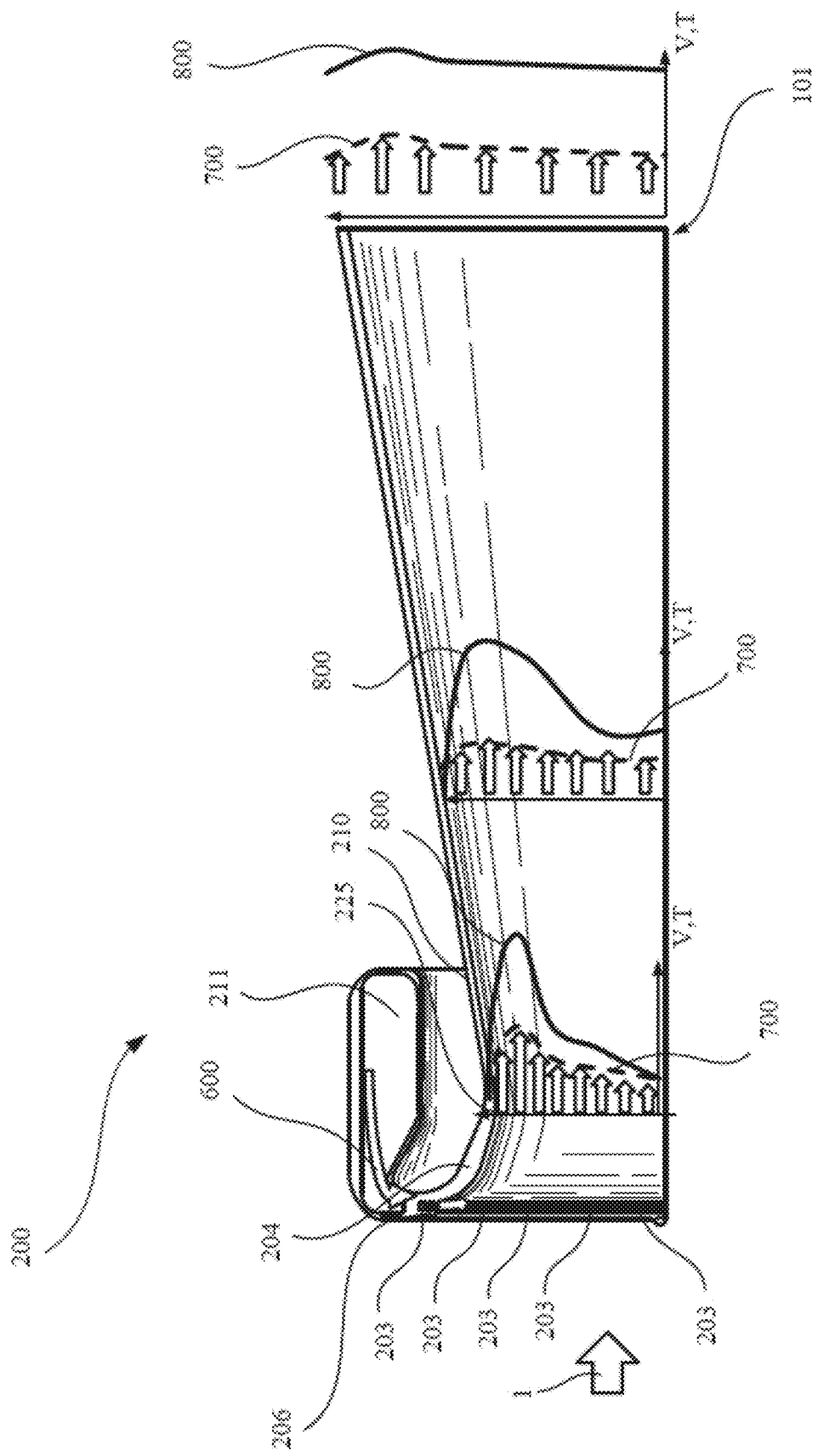
Figure 3:
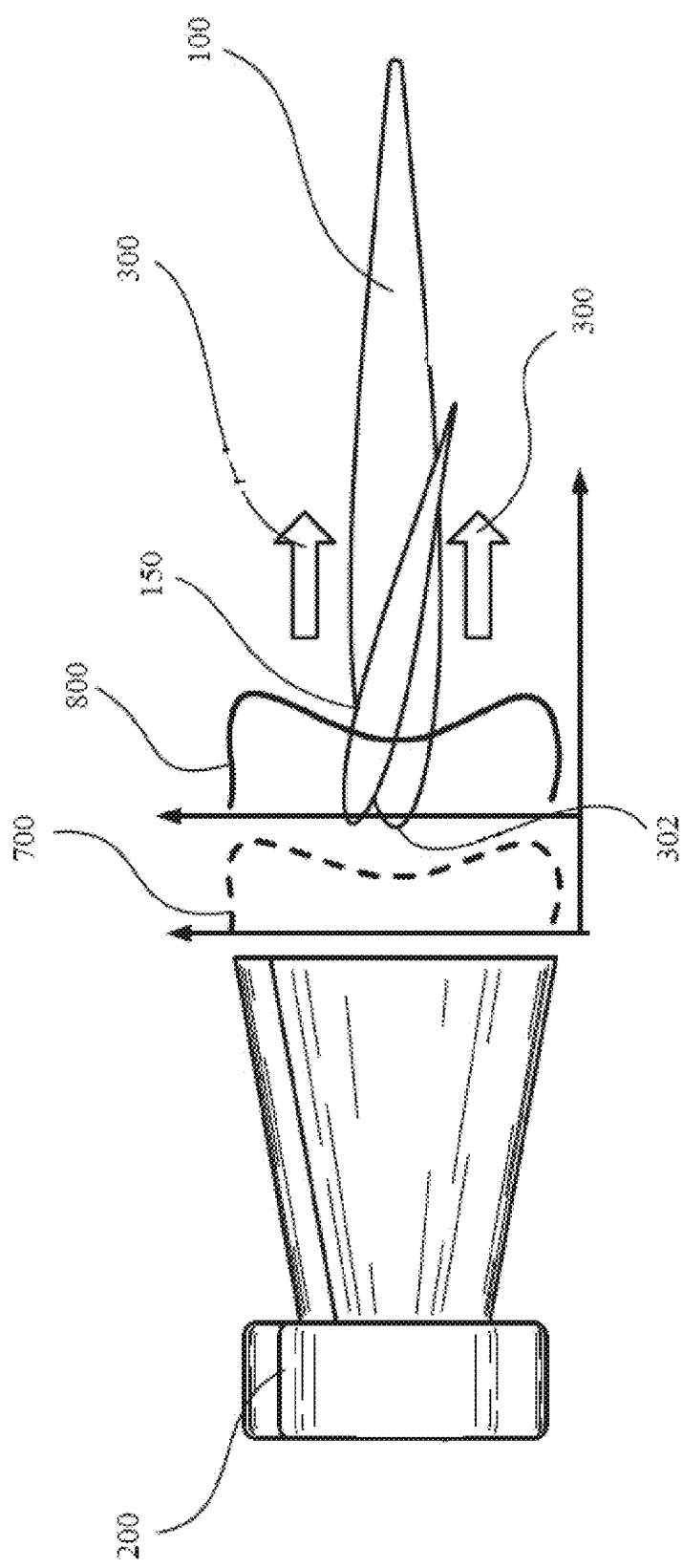

Preferred and alternative embodiments of the present invention are described in detail below with reference to the following drawings:

FIGS. 1-3 illustrate various aspects of the present invention.

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

One or more embodiments primarily use a fluidic heating ejector/Turbo-Heating system (THS) for raising the temperature of the ambient air. Similar to the THS, working on similar principles, Fluidic Propulsive Systems (FPS) are described in, for example, U.S. patent application Ser. Nos. 15/456,450, 15/221,389 and 15/256,178, which are hereby incorporated by reference as if fully set forth herein.

Referring to FIG. 1, hot gases from a gas generator 10 are directed to a conduit 20 and used as motive fluid in ejectors/mixers 200 to entrain ambient air into intake structures 206 of the ejectors and mix the ambient air and motive fluid thoroughly and in a highly turbulent manner inside the ejectors. The result is a well-mixed efflux of ambient and motive gases at a predetermined temperature delta above the ambient temperature.

FIG. 2 illustrates a cross-section of the upper half of an ejector 200 that may be attached to a vehicle (not shown), such as, for non-limiting example, a wheeled trailer or cart. A plenum 211 is supplied with hotter-than-ambient air (i.e., a pressurized motive gas stream) from generator 10, which can be, for example, a combustion-based engine. This pressurized motive gas stream, denoted by arrow 600, is introduced via at least one conduit, such as primary nozzles 203, to the interior of the ejector 200. More specifically, the primary nozzles 203 are configured to accelerate the motive fluid stream 600 to a variable predetermined desired velocity directly over a convex Coanda surface 204 as a wall jet. Additionally, primary nozzles 203 provide adjustable volumes of fluid stream 600. This wall jet, in turn, serves to entrain through an intake structure 206 secondary fluid, such as ambient air denoted by arrow 1, that may be at rest or approaching the ejector 200 at non-zero speed from the direction indicated by arrow 1. In various embodiments, the nozzles 203 may be arranged in an array and in a curved orientation, a spiraled orientation, and/or a zigzagged orientation.

The mix of the stream 600 and the air 1 may be moving purely axially at a throat section 225 of the ejector 200. Through diffusion in a diffusing structure, such as diffuser 210, the mixing and smoothing out process continues so the profiles of temperature (800) and velocity (700) in the axial direction of ejector 200 no longer have the high and low values present at the throat section 225, but become more uniform at the terminal end 101 of diffuser 210. As the mixture of the stream 600 and the air 1 approaches the exit plane of terminal end 101, the temperature and velocity profiles are almost uniform. In particular, the temperature of the mixture is low enough to be directed towards a control surface.

FIG. 3 illustrates the ejector 200, placed in front of a control surface (vane) 100 having a leading edge 302. As is illustrated, control surface 100 is positioned directly behind (i.e., downstream) of outlet structure, such as terminal end 101 of diffuser 210, of ejector such that propulsive fluid from the ejector 200 flows over the control surface. Indeed, in an embodiment, control surface 100 may be positioned close enough to terminal end 101 such that only propulsive fluid from the ejector 200, exclusive of other ambient air, flows over control surface. As used herein, the term "directly behind" may be construed to mean that at least a portion of leading edge 302 is within, or aligned with one of, the planes (a) occupied by surfaces of terminal end 101 that are parallel with the leading edge and (b) extending in the direction axial to ejector 200 (i.e., in the direction of arrows 300 discussed below).

The local flow over control surface 100 is at a high speed due to higher velocity of ejector 200 exit jet efflux, denoted by arrows 300. The ejector 200 mixes vigorously the hotter motive stream 600 (FIG. 2) with the incoming cold ambient stream of air at high entrainment rate. Additional control surfaces can be implemented on the control surface 100, such as elevator surface 150. In an embodiment the entirety of any such control surface is rotatable about an axis oriented parallel to the leading edge 302. The mixture is homogeneous enough to reduce the hot motive stream 600 of the ejector temperature to a mixture temperature profile 800 that will not negatively impact the control surfaces 100 or 150 mechanically or structurally.

With the ejector 200 placed in front of a guiding vane 100, the local flow over the guiding vane is at high speed due to higher velocity 300 of ejector exit jet efflux, when compared to the ambient air. The heater mixes vigorously a hotter motive stream provided by the gas generator 10, with the incoming cold ambient stream of air at high entrainment rate; the mixture is homogeneous enough to reduce the hot motive stream 600 of the ejector temperature to a mixture temperature profile 700 that will not impact the vane mechanically or structurally. The direction of the efflux jet leaving the ejector 200 can be changed by rotation of the vane 100 so that the efflux hot jet is directed towards a target for heating purposes.

One or more embodiments provide architecture allowing a dialing of the openings/passages of the motive fluid by simple closing and opening valves. This system may allow the heater unprecedented levels of performance with better footprint, lower noise and more compact space requirements, better reliability and operating costs because of simpler mechanisms compared to legacy systems.

An embodiment includes a gas generator connected fluidically with at least one heater ejector having a variable faceplate that can close almost completely, thereby forcing the flow of the gas produced by the gas generator to accelerate and entrain more ambient air than the other branch/heater. The gas generator may be connected to several ejector/mixers/heaters that separately and differently entrain air by expanding the hot, pressurized gas from the gas generator over the Coanda surface of the ejector, after which exhaust gases are vigorously mixed with the colder, entrained air, then the mixture is expelled out of the system. The advantage would be a non-uniform distribution of heat output for drying/heating large areas that have non-uniformly cured/been heated; examples include cement curing, ground defrosting, equipment defrosting.

Referring again to FIG. 1, a turbine that can be a microturbine is used as a gas generator 10 to generate temperatures of gases at high speeds and pressures for instance of 500-800 degree C. The hot gases are directed via the conduit 20 into the ejectors 200 which have a plenum, a motive fluid series of slots that introduce the hot stream as wall jets across a Coanda wall surface; the local static pressure drops due to the high local velocities, resulting in lower local static pressure. The latter forces the ambient air to rush in and equalize the pressure. Fresh, ambient air is then entrained and carried in a highly turbulent fashion by a shear layer of a growing hot boundary layer formed by the hot gases. As the axial speed along the walls reduces, the boundary layer grows significantly, thoroughly mixing the two gases (hot and cold) and resulting in a nearly uniform temperature and speed profile of the emerging mixed jet, the behavior of which is illustrated in FIG. 2.

When using a turbine, the number of parts is reduced significantly, meaning much larger Maintenance Intervals, ergo lower costs of operation.

Using a turbine as gas generator to move a small amount of hot gas and drive a massive entrainment of fresh air will result in very appropriate temperature rise needed by the process, combined with a favorable volumetric flow and a convective, high velocity heating stream which may be directed to a target or used via a conduit to the destined target.

A turbine will reduce significantly the NOx, CO and UHC emissions.

For example, depending on the flow rate required by the application, for heat outputs of 1.4 M BTU, an embodiment can get down to 11-12 gal/hr., but it's easy also to scale the technology up, by using a simple turbomachinery plus reheat process. The overall use of fuel schedule to maintain a compression+combustion+turbine operation and deliver a heating stream of exhaust gas to our patented Fluidic Technology; in one example, the Fluidic technology takes the heated exhaust gas at around 550 C after it left the turbine and uses the hot stream to entrain ambient air at e.g., 10 degree C. in our THS system at a ratio 5:1 to 10:1, depending on desired final temperature; the mixture is highly turbulent and at the exit of the process a stream of air of a temperature of e.g., (5×10 C+550 C/(1+5))=100 degree C. mixture temperature; with further improvements the fluidic turbo-heater will burn <12 gal/hr.; at 12 gal/hr., the heat input is the Lower Heating Value of the fuel used times its flow, so around 43 MJ/kg×12 gal/h×3 kg/gal=1548 MJ/h, or 430 kW; 430 kW is the equivalent of 24,450 BTU/min, so in one hour the input is around 1,467,000 BTUs (via fuel/Diesel feed). If the sizing of the flowrate of the turbine is around 0.8 kg/s of flow at full speed, the ambient air entrained by the hot gas is 7 times the core flow, so 7×0.8 kg/s is 5.6 kg/s of air exiting the FPS system. If e.g., the inlet temperature is 288 K (15 C or 59 F) and the hot gas is 875 K (602 C or 1112 F) then the final mixture leaving the FPS is at around (875+7×288)/8=361 K (88 C or 190 F) hence a difference of 88 C−15 C=73 C (131 F), similar to what the competition is doing (temperature rise) and the total air flow is around 5.6 kg/s or at 1.2 kg/m3 (in imperial units 12.3 lb/s with standard density 0.0752 lb/ft3) resulting in 9800 SCFM; the Heat Output is then calculated as Mass flow rate×Sp Heat Capacity Air×Temperature Rise or 5.6 kg/s×1 KJ/kg-K×73 K=409 KJ/s or 409 kW or 1.4 MBTU/hr.; the efficiency of the system would be 1400000/1467000=95%.

The system is similar to a direct fired system; would use a hot gas stream from a turbine and a proprietary mixing system called FPS (see patents). Cold air is entrained and mixed with the hot, smaller stream from the gas turbine. The end mixture is nearly uniform in temperature and is moving at relatively high velocity out of the FPS towards the heating target; by controlling the amount of cold air entrained and the temperature and flows of the hot stream emerging from the turbine, we control the temperature of the final mixture; sensors are establishing the correct RPM of turbine and fuel flow schedule for the heater, thermocouples detect the temperature exiting the turbine and a thermocouple may also be installed in the wake of the heaters. A controlled loop mechanism may be implemented to control the temperature within 25 F degree precision and using the 2 knobs: entrainment ratio within the FPS (mechanically adjusting an opening) and hot stream temperature by modulating the fuel flow; the ambient temperature is also taken into account via sensors.

The outlet temperature is adjustable via the fuel input and the control of the entrainment ratio (mechanically adjusting the openings of the proprietary system; the product can automatically adjust according to the needs, typically between 60-150 Celsius temperature rise; it can run from freezing (winter) to hot (summer); the turbine operation is also monitoring the exhaust (hot) stream temperature.

CFM range can be between 5000-15000 CFM depending on the size desired.

Various fuel can be used for heating, gaseous as well as liquid, as in some of the power generation gas turbines which are dual fuel.

A fluidic turbo-heater may also be more portable, lighter than a Diesel ICE based heater and more efficient. Lower in emissions and cheaper to operate with longer maintenance intervals, having significantly lower moving parts and no need for liquid cooling as in the case of a Diesel based heater.

Velocities emerging from the fluidic turbo-heater may exceed 100 m/s, impacting large surface areas downstream of the exhaust.

A fluidic turbo-heater will prevent runaways of the Diesel type, i.e. not requiring an air shut-off (ASO) for stopping it, but only needing a purge of the system at the end of the run to clear all flammables from the turbine and fluidic system.

Compared to prior art the THS would entrain massive amounts of air and not subject that flow to a complex heat exchanger with internal lossy passages, but instead using the forced convection and turbulent mixing inside the ejector mixers to thoroughly mix the hot and cold stream without conduction or walls. No fan is needed either, for which more power is required from the microturbine.

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A heating system configured to produce heated fluid, the system comprising:
    a source of primary fluid;
    a diffusing structure comprising an outlet structure out of which the heated fluid flows;
    at least one conduit coupled to the source and the diffusing structure and configured to introduce to the diffusing structure the primary fluid;
    an intake structure coupled to the diffusing structure and configured to introduce to the diffusing structure a secondary fluid accessible to the system, wherein the heated fluid comprises the primary and secondary fluids,
    a first control surface having a leading edge and located close enough to the outlet structure such that heated fluid from the outlet structure flows over the first control surface; and
    a second control surface having a leading edge and directly coupled to a vehicle coupled to the heating system, wherein the first control surface is coupled to the second control surface such that the leading edge of the first control surface is adjustably offset from the leading edge of the second control surface.

2. The system of claim 1, wherein the heated fluid flows out of the outlet structure at a predetermined adjustable velocity.

3. The system of claim 1, wherein, during operation of the system, only heated fluid from the outlet structure flows over the first control surface.

4. The system of claim 1, further comprising a convex surface, the diffusing structure being coupled to the convex surface, and the at least one conduit is coupled to the convex surface and configured to introduce the primary fluid to the convex surface.

5. The system of claim 1, wherein the entirety of the first control surface is rotatable about an axis oriented parallel to the leading edge.

6. The system of claim 1, wherein the vehicle is a wheeled vehicle coupled to the diffusing structure.

7. The system of claim 1 wherein the source of primary fluid is a steam generator.

\* \* \* \* \*